(12) United States Patent
Trestain

(10) Patent No.: US 10,440,493 B2
(45) Date of Patent: Oct. 8, 2019

(54) AUDIBLE PROMPTS IN A VEHICLE NAVIGATION SYSTEM

(71) Applicant: Harman International Industries, Incorporated, Stamford, CT (US)

(72) Inventor: Christopher Michael Trestain, Livonia, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/941,556

(22) Filed: Mar. 30, 2018

(65) Prior Publication Data

US 2018/0302736 A1  Oct. 18, 2018

Related U.S. Application Data

(60) Provisional application No. 62/486,403, filed on Apr. 17, 2017.

(51) Int. Cl.
| | |
|---|---|
| *H04S 7/00* | (2006.01) |
| *G08G 1/0968* | (2006.01) |
| *H04R 5/02* | (2006.01) |
| *H04R 3/04* | (2006.01) |
| *H04S 3/00* | (2006.01) |
| *H04R 5/04* | (2006.01) |
| *G01C 21/36* | (2006.01) |

(52) U.S. Cl.
CPC .......... *H04S 7/302* (2013.01); *G01C 21/3629* (2013.01); *G08G 1/096872* (2013.01); *H04R 3/04* (2013.01); *H04R 5/02* (2013.01); *H04R 5/04* (2013.01); *H04S 3/008* (2013.01); *H04R 2499/13* (2013.01); *H04S 2400/01* (2013.01)

(58) Field of Classification Search
CPC ........ H04S 7/30; H04S 7/302; H04S 2400/01; H04S 2400/11; G01C 21/3629; G08G 1/096872; H04R 3/04; H04R 3/008; H04R 5/02; H04R 5/04; H04R 2499/13
USPC ................................... 381/302, 86
See application file for complete search history.

(56) References Cited

U.S. PATENT DOCUMENTS

| | | | |
|---|---|---|---|
| 9,855,893 B2 * | 1/2018 | Christoph | ............. B60Q 9/007 |
| 2005/0128106 A1 | 6/2005 | Nakaishi | |
| 2007/0219718 A1 | 9/2007 | Pennock | |
| 2008/0215239 A1 | 9/2008 | Lee | |
| 2008/0267413 A1 * | 10/2008 | Faller | ..................... H04S 3/002 |
| | | | 381/1 |
| 2009/0093957 A1 | 4/2009 | Se | |
| 2009/0216441 A1 | 8/2009 | Bainbridge et al. | |

(Continued)

FOREIGN PATENT DOCUMENTS

WO    WO2005/098365    10/2005

OTHER PUBLICATIONS

Pavel Zahorik et al: Auditory Distance Perception in Humans: A Summary of Past and Present Research, Acta Acustica United with Acustica vol. 91 (2005), pp. 409-420.

*Primary Examiner* — Khai N. Nguyen
*Assistant Examiner* — Sabrina Diaz
(74) *Attorney, Agent, or Firm* — Angela M. Brunetti

(57) ABSTRACT

An audio signal associated with a navigation prompt is processed, based on the localization and distance information supplied by a navigation system, to generate an audio signal that, when played by an audio system in the vehicle, emulates the localization and distance information.

7 Claims, 4 Drawing Sheets

(56) References Cited

U.S. PATENT DOCUMENTS

2009/0306891 A1* 12/2009 Jeon .................. G01C 21/36
  701/533
2011/0066365 A1   3/2011 Khawand
2013/0158856 A1   6/2013 Xiang
2015/0030159 A1* 1/2015 Ozcan ................ G01C 21/3629
  381/17

* cited by examiner

AUDIBLE PROMPTS IN A VEHICLE NAVIGATION SYSTEM

CROSS REFERENCE TO RELATED APPLICATIONS

This application claims the benefit of U.S. Provisional Application Ser. No. 62/486,403, filed Apr. 17, 2017, the disclosure of which is incorporated in its entirety by reference.

TECHNICAL FIELD

The present disclosure is directed to signal processing arrangement of audible prompts in a vehicle navigation system.

BACKGROUND

A navigation system is known to provide an acoustic route overview which presents audible prompts for turn-by-turn directions to a user and guide them to a desired destination. The navigation system typically includes a global positioning system (GPS) that tracks the changing locations of the vehicle on the surface of the earth in real time. When a user enters a desired destination, the navigation system presents an acoustic route overview that is audibly reproduced on at least one loudspeaker in the vehicle. The turn-by-turn route may also include distance information as well as information related to the curvature or sharpness of an upcoming turn. For example, a computer voice will announce "slight left turn in point five miles" or "hard right turn in one hundred feet" as navigation prompts issued by the navigation system. The user will only hear the command and listen to the instructions by hearing the command.

There is a need for enhanced audible prompts in a navigation system that will help a user better understand a command relative to localization and distance information associated with the upcoming command as the information is applied to an audio treatment of the voice prompt.

SUMMARY

Before a navigation prompt, such as a chime or a computer aided voice, interrupts normal audible playing of an audio mode to announce an upcoming instruction, the audio signal associated with the navigation prompt and instruction is processed, based on the localization and distance information supplied by a navigation system, to generate an audio signal that, when played by an audio system in the vehicle, emulates the localization and distance information. The audio signal may be adjusted to add a sense of direction and distance to the audible prompt such that direction and distance information can be audibly detected, or perceived, by the user. The effect is that a user receives a sense of the position upon hearing the audible prompt within the vehicle interior.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

While various aspects of the present disclosure are described with reference to a particular illustrative embodiment, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure. All references to circuits or other electrical devices and the functionality provided by each are not intended to be limited to only what is illustrated and described herein. Such circuits and other electrical devices may be combined with or separated based on implementation. Further, controllers, processors, integrated circuits, memory devices, may be configured to execute a program that is embodied in a non-transitory computer readable medium that may be programmed to perform any number of functions.

Figure 1:
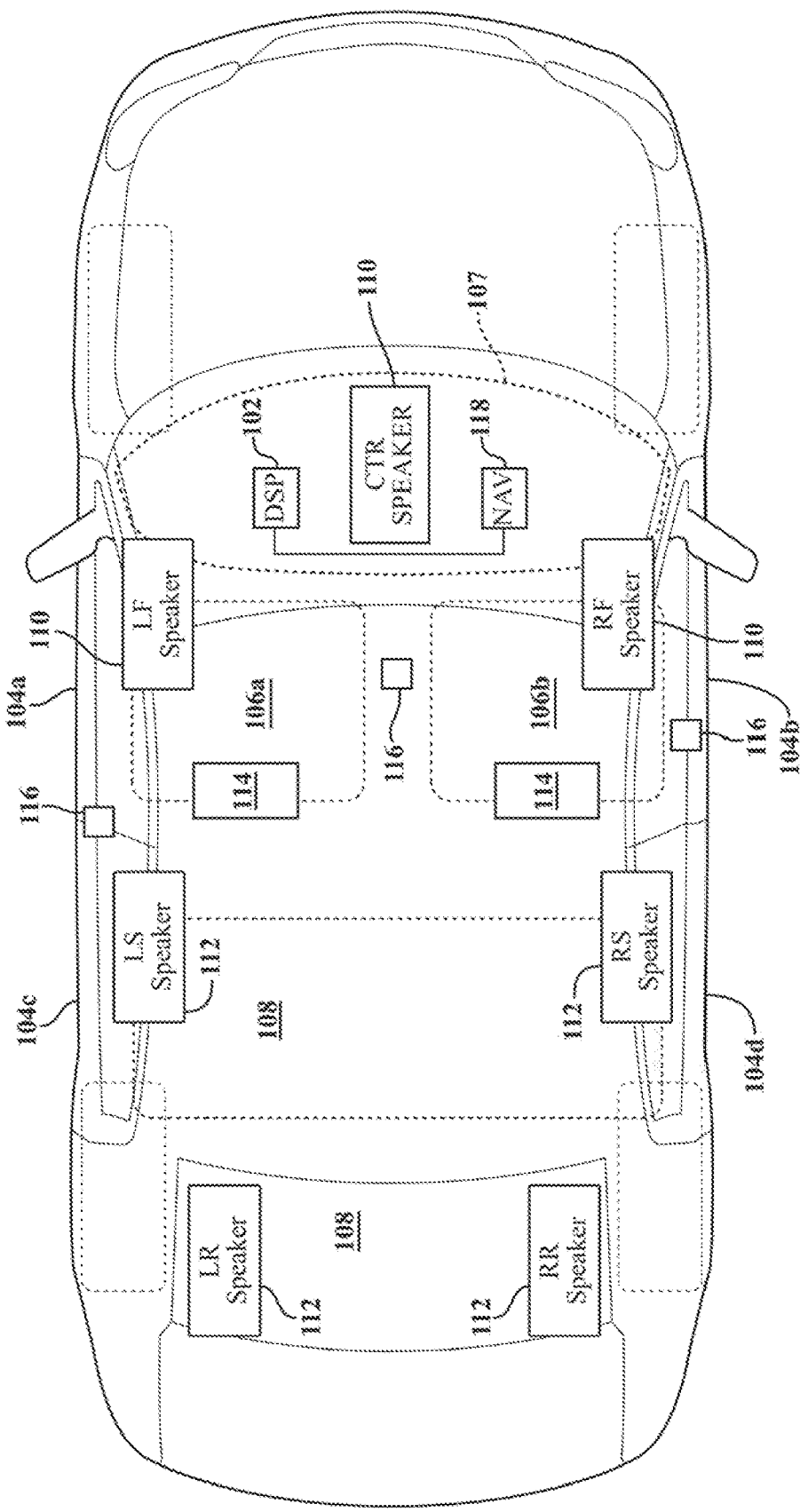
FIG. 1 is a block diagram of a vehicle having an audio system and a navigation system.

FIG. 1 is a block diagram of a vehicle 100 having an audio system, also called a digital signal processing system (DSP) 102 that may include any, or a combination of, sound processing systems and methods described herein. The vehicle 100 may include doors 104a-d, front seats 106a, 106b and a rear seat 108. The vehicle may have more or fewer doors than what is shown in FIG. 1. For example, the vehicle may be a car, truck, boat, motorcycle. The particular seat configuration may also have more or fewer seats, such as no backseat or an additional third-row seating. The DSP 102 supports the use of various sources for audio, such as a radio, CI) player, DVD player, mobile devices and the like which are not shown in FIG. 1. The audio system, or digital signal processing system 102 improves the reproduction of sound by controlling the amplitude phase and mixing ratios between discrete and passive decoder surround signals that are projected through loudspeakers, also called speakers. Typically, the vehicle may have one or more front speakers 110 and one or more rear speakers 112. The vehicle may have rear-facing speakers 114. The rear-facing speakers may be positioned in the front seats 106a, b, to face passengers in the rear seat 108. Most audio systems also include one or more microphones 116 mounted throughout the vehicle interior. A navigation source 118 provides localization and distance information to the DSP 102. The navigation source 118 may be a vehicle navigation system, a portable GPS, a smart phone or tablet, or other device capable of supplying localization and distance information to the DSP 102. The localization and distance information is associated with a vehicle location and destination.

The DSP 102 produces a sound field by controlling the amplitude, phase, and mixing ratios of output signals by applying a set of tuning parameters to the audio system. The spatial sound field reproduction is controlled re-orientation of the direct, passive and active mixing and steering parameters in the vehicle environment. The mixing and steering ratios may be adaptively modified as a function of noise and other environmental factors. Information from vehicle sensors, microphones or other transducers may be used to control the mixing and steering parameters. The DSP, for example, may be a full-sphere surround sound system, such as an ambisonics engine, or a surround sound system such as a Quantum Logic system.

Figure 2:
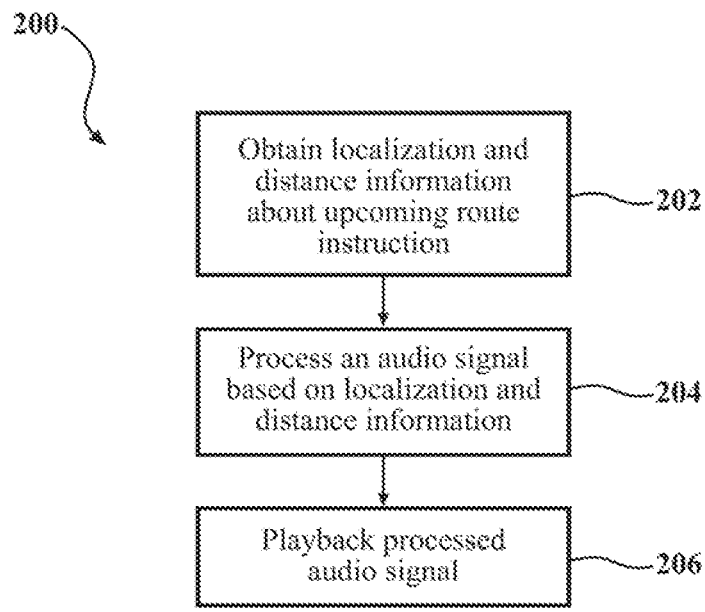
FIG. 2 is a flow chart of one or more embodiments of a signal processing arrangement of audible prompts in a navigation system.

FIG. 2 is a flow chart representative of one or more embodiments of a signal processing arrangement 200 for playing navigation prompts in a vehicle audio system. Typically a user enters a destination into a navigation system, a route is calculated and audible prompts are played through the vehicle audio system at whatever equalizer settings the vehicle audio system has been set to, based on a user's preference for the audio. The navigation system generates a route that includes turn-by-turn instructions to be presented to the user. The audible prompts are an audio signal that may include a notification such as a bell or a chime, and localization and distance information played by way of the audio system. The audio signal is processed, based on the localization and distance information, in a manner that allows the user to hear the location and distance associated with each prompt. For example, an upcoming turn to the right will be heard on a right side of the user. In another example, a prompt indicating the turn to the right is to be made in 0.5 miles may be heard at a lower volume and with a depth that emulates the 0.5 mile distance while a turn to the right that is to be made in 400 feet will be heard at a higher volume with a depth that emulates the much closer distance. In this regard, the user is able to add a sense of direction and distance to the audible prompt.

In order to accomplish this, localization and distance information 202 may be obtained from a navigation source, such as the navigation system associated with the vehicle, and processed 204 in a manner that produces an audio signal that, when played 206, emulates the direction and distance of the prompt. The audio signal to be played 206 may be modified to include settings that create a sense of direction and a sense of distance for the user when output at speakers and with a depth within the vehicle. The source for localization and distance information may be the navigation system itself, a GPS on the vehicle, a portable device such as a smart phone or tablet, sensors and/or processors associated with other vehicle systems. The navigation prompt may be a voice prompt, or a tone, chime, any other indicator, or a combination of an indicator and a voice prompt.

Before a navigation prompt, such as a chime or a computer aided voice, interrupts the normal audible playing of an audio mode to announce an upcoming instruction, the audio signal associated with the navigation prompt and instruction is processed 204 based on the localization and distance information to generate an audio signal that, when played 206 by the audio system in the vehicle to emulate the obtained localization and distance information. The audio signal may be adjusted to add a sense of direction and distance to the audible prompt such that direction and distance information can be audibly detected, or perceived, by the user. The effect is that a user receives a sense of the position upon hearing the audible prompt within the vehicle interior.

The localization information is representative of a direction of the upcoming instruction such as a left or right turn. The audio signal associated with the prompt may be played such that it is placed in a direction of the vehicle interior to represent the localization direction of the upcoming instruction. This may be accomplished by adjusting the left to right, front to rear speaker output. This is incorporated into playback of the audible prompt by playing the prompt through predetermined speakers in the vehicle, for example, the right side speakers. This may also be accomplished by way of producing an inter-aural level difference between left and right, as controlled by a panner, and an inter-aural time difference to make the sound appear to be coming from a left or right side.

The distance information is representative of a distance associated with the upcoming instruction such as 0.5 miles or 500 feet. The audio signal of the prompt emulates the distance associated with the upcoming prompt by adding depth to the audio signal in the form of reflections. Depth may be added to the audio signal by providing a sense of spatial hearing in the audio. For example, sound pressure level decreases in volume over distance and frequency spectrum dissipates over distance. Knowing the distance information allows the DSP to manipulate the audio signal in a manner that the sound pressure level and frequency spectrum will emulate the distance associated with the prompt.

Figure 3:
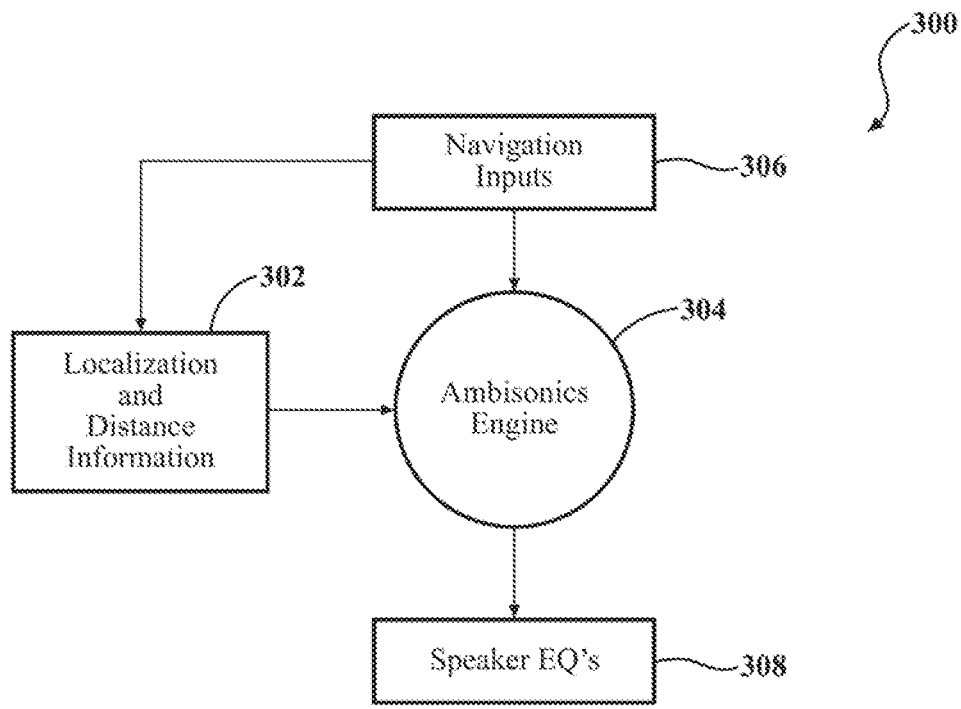
FIG. 3 is a method for implementing the signal processing arrangement.

FIG. 3 is a block diagram of a method 300 for implementing the signal processing arrangement. Localization and distance information 302 is received by a full sphere surround sound system having an upmixer 304. Ambisonics is a full-sphere surround sound technique that places sound anywhere in a 360° spherical location using a plurality of speakers positioned above, below and in a horizontal plane of a listener. Full-sphere surround sound is also capable of adding in early reflections to the audio signal for distance effect. The audio signal for an upcoming navigation prompt 306 is processed by the upmixer 304. The upmixer 304 also uses the localization and distance information 302 to process the audio output signal. The audio output signal is output to the speaker equalizer 308 to be played by the vehicle audio system.

Figure 4:
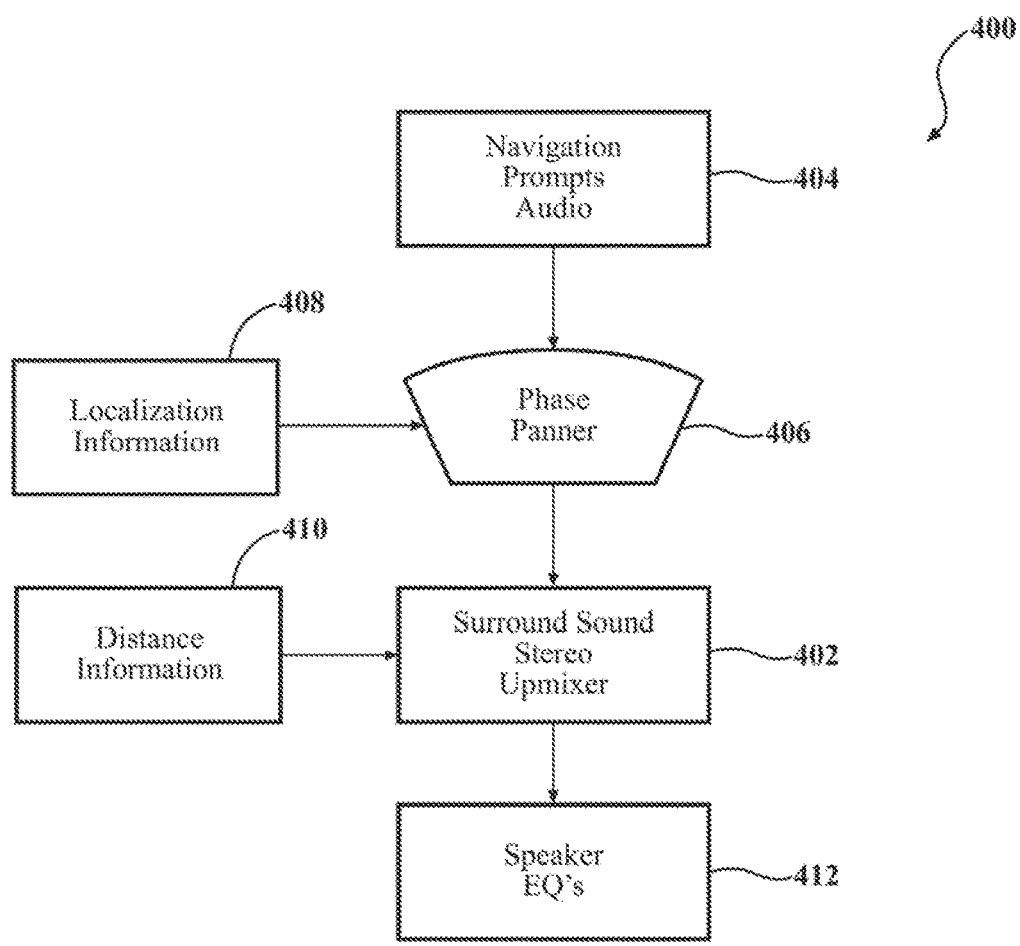
FIG. 4 is a method for implementing the signal processing arrangement.

FIG. 4 is a block diagram of a method 400 for implementing the signal processing arrangement using a more traditional surround sound technology stereo upmixer 402, such as Quantum Logic surround sound processor. An audio signal associated with an upcoming navigation prompt 404 is received by a phase panner 406. The panner 406 also receives localization, or direction, information 408 associated with the upcoming navigation prompt. The direction information 408 is used by the panner 406 to modify the audio signal associated with the upcoming navigation prompt 404 to emulate a direction associated with the upcoming prompt. For example, the panner 406 knows that the upcoming prompt direction is a right turn, so the panner can modify the audio signal to be played so that the audio is perceived to be coming from a right side of the user, emulating direction by associating the direction of the prompt with the playback of the prompt. Distance information 410 is supplied to the stereo upmixer 402 and the audio signal is further adjusted to add in early reflections to add a sense of depth to the audio signal. The audio signal is output to the speaker equalizers 412. The user will not only hear the prompt, but they will detect the distance and direction of the upcoming prompt based on the perceived audio when the prompt is played.

Figure 5:
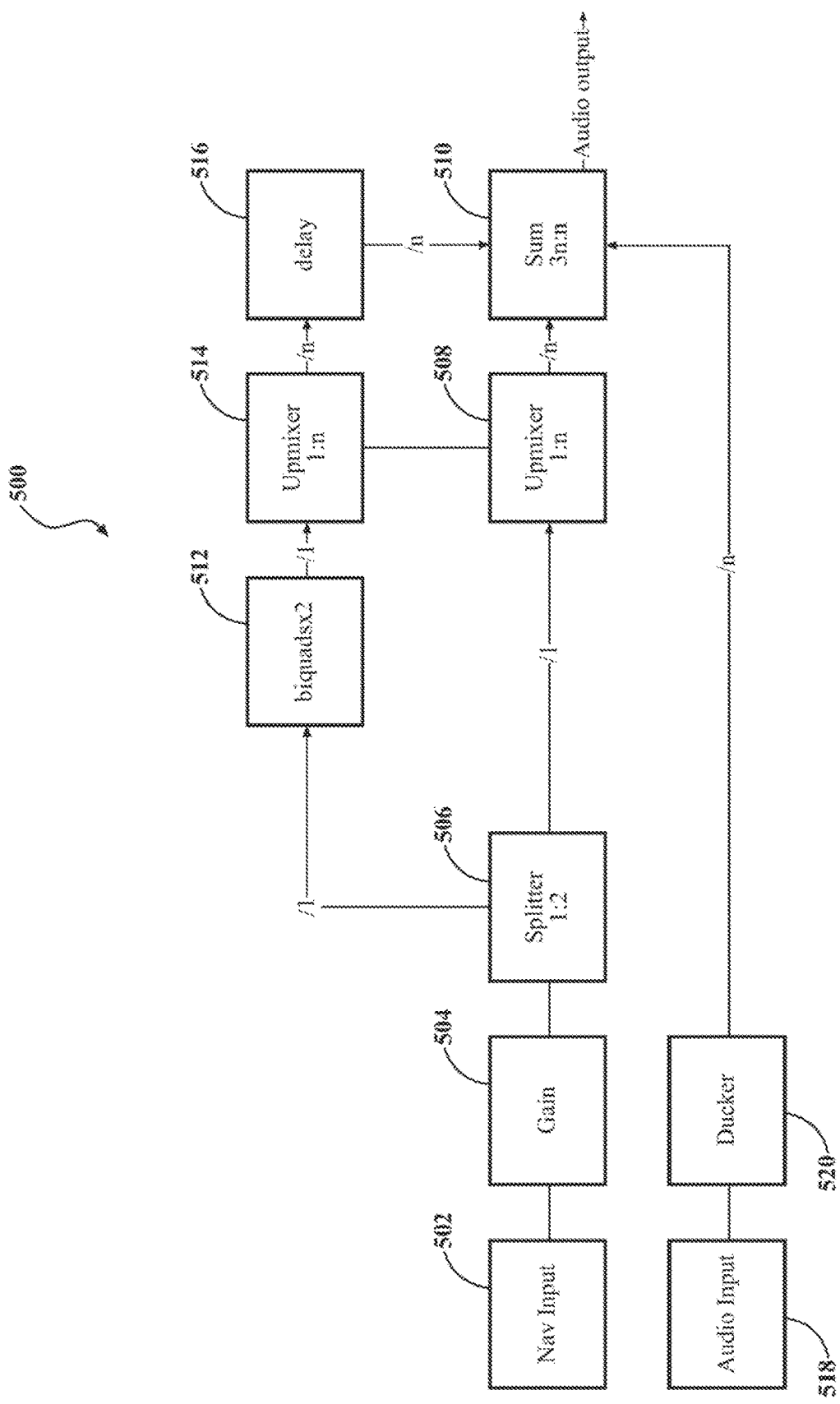
FIG. 5 is a method for implementing the signal processing arrangement.

FIG. 5 is a block diagram of a method 500 for implementing the signal processing arrangement that sends the prompts directly to vehicle audio system speakers. An input 502 includes an audio signal associated with the navigation prompt including direction information and distance information. A gain 504 is applied to the input 502 and the audio signal is split 506 because not all of the speaker outputs need to be subjected to the signal processing using distance and direction information. The audio signal for speakers not subjected to the processing will be separated by splitter 506 and sent to a stereo upmixer 508 and a summer 510.

The audio signal for speakers that are to be subjected to the processing will be separated in the splitter 506 and passed through filters 512. The filters 512 are high and low shelf filters that add reflections to the audio signal. The added reflections are based on the direction and distance information in the navigation input 502. A stereo upmixer 514 splits the audio signal to multiple speakers each with an associated gain to provide an audio signal that, when output, emulates the direction information associated with the upcoming navigation instruction. A delay 516 is added to the audio signal to provide a sense of depth based on the distance information in the navigation input 502. This output is summed at summer 510.

Also shown in FIG. 5 is the normal audio input 518 from the vehicle audio system that is subjected to a ducker 520 when the navigation prompts are to be played by the vehicle audio system. The ducker 520 will reduce or mute the playback of any other audio that isn't associated with the navigation prompt being played through the audio system in the vehicle.

In the foregoing specification, the present disclosure has been described with reference to specific exemplary embodiments. Various modifications and changes may be made, however, without departing from the scope of the present disclosure as set forth in the claims. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

The invention claimed is:

1. A method for playing audible prompts from a navigation system, the method carried out on a device having a processing unit including a non-transitory computer-readable storage medium capable of executing instructions of a software program, the method comprising the steps of:
   receiving, at the processing unit, an audio signal representative of an audible navigation prompt;
   receiving, at the processing unit, a signal representative of a direction associated with the audible navigation prompt;
   receiving, at the processing unit, a signal representative of a distance associated with the audible navigation prompt;
   processing the audio signal representative of the audible navigation prompt to emulate the direction and the distance associated with the audible navigation prompt, wherein the step of processing the audio signal further comprises the steps of;
   splitting the audio signal representative of the audible navigation prompt into a first audio signal and a second audio signal, only the second audio signal is subjected to processing using direction and distance associated with the audible navigation prompt to be output only at predetermined sneakers, each predetermined sneaker having an associated gain;
   filtering the second audio signal in order to add reflections to the second audio signal, the reflections are based on the direction and distance information;
   after the step of filtering the second audio signal, splitting the second audio signal into the predetermined speakers each with an associated gain to provide a signal that when output emulates the direction information;
   after the step of splitting the second audio signal, adding a delay to the second audio signal to provide a sense of depth based on the distance information;
   combining the processed second audio signal and the first audio signal; and
   playing the combined audio signal representative of the audible navigation prompt using a vehicle audio system.

2. A non-transitory computer readable medium comprising a program, which, when executed by at least one processor, performs operations comprising:
   receiving, an audio signal representative of an audible navigation prompt;
   receiving a navigation signal representative of a direction associated with the audible navigation prompt;
   receiving a navigation signal representative of a distance associated with the audible navigation prompt;
   modifying the audio signal representative of the audible navigation prompt to emulate the direction and the distance associated with the audible navigation prompt by splitting the audio signal representative of the audible navigation prompt into a first audio signal and a second audio signal, only the second audio signal is subjected to processing using direction and distance associated with the audible navigation prompt to be output at predetermined speakers, each predetermined speaker having an associated gain;
   filtering the second audio signal in order to add reflections to the second audio signal, the added reflections are based on the direction and distance information;
   after the step of filtering the second audio signal, splitting the second audio signal into the predetermined speakers each with an associated gain to provide a signal that when output emulates the direction information;
   after the step of splitting the second audio signal, adding a delay to the second audio signal to provide a sense of depth based on the distance information;

combining the processing second audio signal and the first audio signal; and playing the combined audio signal representative of the audible navigation prompt using a vehicle audio system.

3. The program as claimed in claim 2, which, when executed by at least one processor, performs operations further comprising modifying the audio signal representative of the audible navigation prompt to emulate the direction and the distance associated with the audible navigation prompt by producing an inter-aural level difference and an inter-aural time difference.

4. The program as claimed in claim 2, which when executed by at least one processor performs operations further comprising modifying the audio signal representative of the audible navigation prompt to emulate the direction and the distance associated with the audible navigation prompt by adjusting left-to-right and front-to-rear speaker outputs.

5. The program as claimed in claim 2, which, when executed by at least one processor, performs operations further comprising modifying the audio signal representative of the audible navigation prompt to emulate the direction and the distance associated with the audible navigation prompt by adjusting a sound pressure level.

6. The program as claimed in claim 2, which, when executed by at least one processor, performs operations further comprising modifying the audio signal representative of the audible navigation prompt to emulate the direction and the distance associated with the audible navigation prompt by adjusting a frequency spectrum dissipation.

7. The program as claimed in claim 2, which, when executed by at least one processor, performs operations further comprising ducking the first audio signal when playing the second audio signal processed using direction and distance information.

\* \* \* \* \*